United States Patent [19]

Quinn et al.

[11] Patent Number: 4,687,819

[45] Date of Patent: Aug. 18, 1987

[54] POLYTEREPHTHALATECARBONATE-POLYETHERIMIDE-POLYESTER BLENDS

[75] Inventors: Clayton B. Quinn, Mt. Vernon, Ind.; Fred F. Holub, Schenectady, N.Y.

[73] Assignee: General Electric Company, Pittsfield, Mass.

[21] Appl. No.: 687,976

[22] Filed: Dec. 31, 1984

[51] Int. Cl.[4] .................... C08F 283/04; C08L 77/00
[52] U.S. Cl. .................................... 525/425; 525/433; 525/439
[58] Field of Search ................. 525/425, 433, 439

[56] References Cited

U.S. PATENT DOCUMENTS

| | | | |
|---|---|---|---|
| 4,141,927 | 2/1979 | White et al. | 525/432 |
| 4,225,687 | 9/1980 | deTorres | 525/423 |
| 4,250,279 | 2/1981 | Robeson et al. | 525/425 |
| 4,414,230 | 11/1983 | Hanabata et al. | 525/439 |
| 4,430,484 | 2/1984 | Quinn | 525/425 |

*Primary Examiner*—Lewis T. Jacobs
*Assistant Examiner*—A. L. Carrillo
*Attorney, Agent, or Firm*—Bernard, Rothwell & Brown

[57] ABSTRACT

This invention is concerned with a new class of thermoplastic polymer blends which comprise in admixture a polyterephthalatecarbonate, a polyetherimide and a polyester.

14 Claims, No Drawings

POLYTEREPHTHALATECARBONATE-POLYETHERIMIDE-POLYESTER BLENDS

BACKGROUND OF THE INVENTION

This invention relates to thermoplastic compositions comprised of a blend of polymers. More particularly, it relates to a ternary polymer blend containing as one of the ingredients, a polyetherimide.

Polyetherimide resins are well known and are of considerable value for use in molding compositions because of their excellent physical, chemical and thermal properties. The high glass transition and heat deflection temperatures exhibited by these polymers permit their use in high performance applications previously reserved for metals and some thermoset resins. These high glass transition temperatures also require, however, that the polymers be processed at relatively high temperatures, compared to other injection moldable thermoplastics. High processing temperatures require more expensive equipment and greater energy costs. For many applications, it would be desirable to have a resin with a lower processing temperature, yet which maintains the toughness and other advantageous physical properties of polyetherimides.

It is known that the processing temperatures of polyetherimides can be reduced by forming blends of those polymers with polyesters, such as polyethylene terephthalate or polybutylene terephthalate. See, White et al., U.S. Pat. No. 4,141,927. Although such blends maintain many of the physical properties of polyetherimides, they have not been found to have the toughness or impact strengths characteristic of polyetherimides.

Binary blends of polyestercarbonate resins and polyetherimides have been prepared for the primary purpose of improving the thermal properties of the polyestercarbonates. See, Quinn et al., U.S. Pat. No. 4,430,484. Again, although these blends exhibit certain advantageous properties, they have not been found to possess the toughness or impact properties of polyetherimides.

Thus, there exists a need for a polymer blend which requires lower processing temperatures than polyetherimides, yet maintains the toughness and impact properties of those polymers.

SUMMARY OF THE INVENTION

In accordance with the present invention, a thermoplastic composition comprises, in admixture, a polyetherimide, a polyterephthalatecarbonate and an aromatic polyester.

DETAILED DESCRIPTION OF THE INVENTION

The instant invention relates to a polymeric blend containing a polyetherimide, a polyterephthalatecarbonate and an aromatic polyester. The polyterephthalatecarbonate is prepared from a dihydric phenol, a carbonate precursor, a terephthalic acid or ester forming derivative thereof and an isophthalic acid or ester forming derivative thereof. The polyterephthalatecarbonate is further characterized by having from about 70 to about 95 weight percent ester content and a range of isophthalate groups ranging from about two to about 15 percent of the ester content. These ternary blends exhibit lower processing temperatures and viscosities than unmodified polyetherimides, yet maintain relatively high impact strengths.

The polyetherimides which can be used in the instant invention contain repeating units of the formula

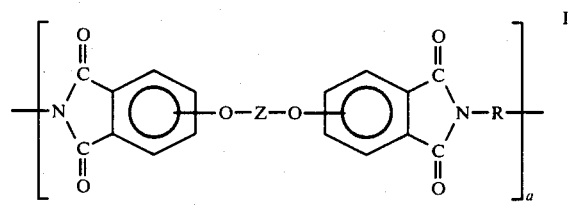

where "a" represents a whole number in excess of 1, e.g., 10 to 10,000 or more, —O—Z—O— is in the 3 or 4- and 3' or 4'-positions, and Z is a member of the class consisting of (1)

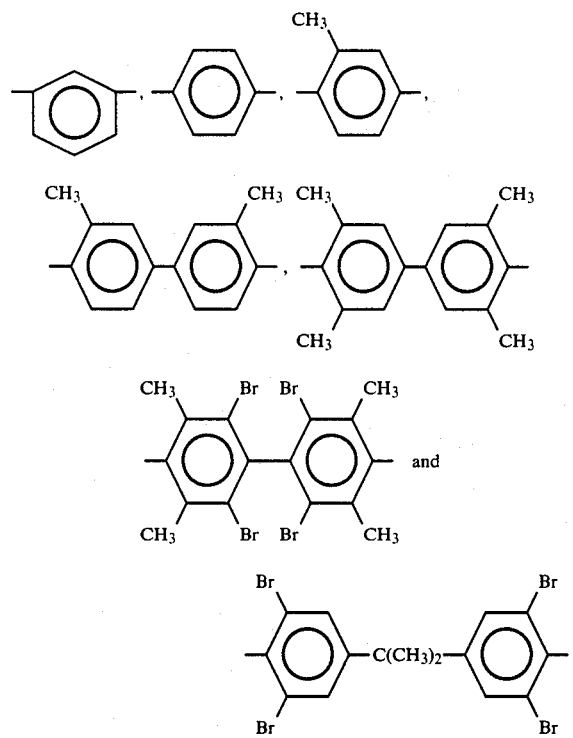

and (2) divalent organic radicals of the general formula:

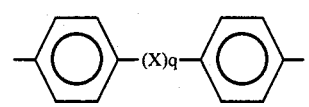

where X is a member selected from the class consisting of divalent radicals of the formulas,

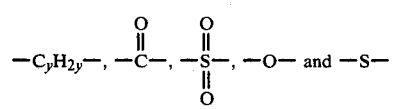

where q is 0 or 1, y is a whole number from 1 to 5, and R is a divalent organic radical selected from the class consisting of (a) aromatic hydrocarbon radicals having from about 6 to about 20 carbon atoms and halogenated derivatives thereof, (b) alkylene radicals and cycloalkylene radicals having from about 2 to about 20 carbon atoms, (c) from $C_2$ to about $C_8$ alkylene terminated polydiorganosiloxane, and (d) divalent radicals iof the general formula $$-\langle\bigcirc\rangle-Q-\langle\bigcirc\rangle-$$

where Q is a member selected from the class consisting of $$-O-,\ -\underset{O}{\overset{O}{\underset{\|}{C}}}-,\ -\underset{\underset{O}{\|}}{\overset{O}{\underset{\|}{S}}}-,\ -S-\ \text{and}\ -C_xH_{2x}-$$

where x is a whole number from 1 to 5 inclusive.

The polyetherimides of Formula I can be obtained by any of the methods well-known to those skilled in the art including the reaction of any aromatic bis(ether anhydride)s of the formula $$\text{II}$$

where Z is as defined hereinbefore with a diamine compound of the formula $$H_2N-R-NH_2 \qquad \text{III}$$

where R is as defined hereinbefore. In general, the reactions can be carried out employing well-known solvents, e.g., o-dichlorobenzene, m-cresol/toluene, etc., to effect interaction between the dianhydrides and the diamines, at temperatures of from about 100 to about 250° C. Alternatively, the polyetherimides can be prepared by melt polymerization of any dianhydride of Formula II with any diamine compound of Formula III while heating the mixture of the ingredients at elevated temperatures with concurrent intermixing. Generally, melt polymerization temperatures between about 200° to 400° C. and preferably 230° to 300° C. can be employed. The conditions of the reaction and the proportions of ingredients can be varied widely depending on the desired molecular weight, intrinsic viscosity, and solvent resistance. In general, equimolar amounts of diamine and dianhydride are employed for high molecular weight polyetherimides, however, in certain instances, a slight molar excess (about 1 to 5 mol percent) of diamine can be employed resulting in the production of polyetherimides having terminal amine groups. Generally, useful polyetherimides (hereinafter sometimes referred to as PEI) of Formula I have intrinsic viscosities $[\eta]$ greater than 0.2 deciliters per gram, preferably 0.35 to 0.60, or 0.7 deciliters per gram or even higher when measured in m-cresol at 25° C.

Included among the many methods of making the polyetherimides of Formula I are those disclosed in U.S. Pat. Nos. 3,847,867, Heath et al. 3,847,869, Williams 3,850,885, Takekoshi et al. 3,852,242 and 3,855,178, White etc. These disclosures are incorporated herein in their entireties by reference for the purpose of teaching, by way of illustration, general and specific methods for preparing polyetherimides suited to the practice of this invention.

The aromatic bis(ether anhydride)s of Formula II include, for example,
2,2-bis[4-(2,3-dicarboxyphenoxy)phenyl]-propane dianhydride;
4,4'-bis(2,3-dicarboxyphenoxy)diphenyl ether dianhydride;
1,3-bis(2,3-dicarboxyphenoxy)benzene dianhydride;
4,4'-bis(2,3-dicarboxyphenoxy)diphenyl sulfide dianhydride;
1,4-bis(2,3-dicarboxyphenoxy)benzene dianhydride;
4,4'-bis(2,3-dicarboxyphenoxy)benzophenone dianhydride;
4,4'-bis(2,3-dicarboxyphenoxy)diphenyl sulfone dianhydride; etc.
2,2-bis[4-(3,4-dicarboxyphenoxy)phenyl]propane dianhydride;
4,4'-bis(3,4-dicarboxyphenoxy)diphenyl ether dianhydride;
4,4'-(3,4-dicarboxyphenoxy)diphenyl sulfide dianhydride;
1,3-bis(3,4-dicarboxyphenoxy)benzene dianhydride;
1,4-bis(3,4-dicarboxyphenoxy)benzene dianhydride
4,4'-bis(3,4-dicarboxyphenoxy)benzophenone dianhydride;
4-(2,3-dicarboxyphenoxy)-4'-(3,4-dicarboxyphenoxy) diphenyl-2,2-propane dianhydride; etc. and mixtures of such dianhydrides.

Aromatic bis(ether anhydride)s included by Formula II are also shown by Koton, M. M.; Florinski, F. S.; Bessonov, M. I.; Rudakov, A. P. (Institute of Heteroorganic Compounds, Academy of Sciences, U.S.S.R. 257,010, Nov. 11, 1969, Appl. May 3, 1967. In addition, diahydrides are shown by M. M. Koton, F. S. Florinski, Zh. Org. Khin., 4(5), 774 (1968).

The organic diamines of Formula III include, for example,
m-phenylenediamine,
p-phenylenediamine,
4,4'-diaminodiphenylpropane,
4,4'-diaminodiphenylmethane, benzidine,
4,4'-diaminodiphenyl sulfide,
4,4'-diaminodiphenyl ether,
1,5-diaminonaphthalene,
3,3'-dimethylbenzidine,
3,3'-dimethoxybenzidine,
2,4-bis($\beta$-amino-t-butyl)toluene,
bis(p-$\beta$-amino-t-butylphenyl)ether,
bis(p-$\beta$-methyl-o-aminopentyl)benzine,
1,3-diamino-4-isopropylbenzene,
1,2-bis(3-aminopropoxy)ethane,
m-xylylenediamine,
p-xylylenediamine,
2,4-diaminotoluene,
2,6-diaminotoluene,
bis(4-aminocyclohexyl)methane,
3-methylheptamethylenediamine,
4,4-dimethylheptamethylenediamine,
2,11-dodecanediamine,
2,2-dimethylpropylenediamine,
octamethylenediamine,
3-methoxyhexamethylenediamine,
2,5-dimethylhexamethylenediamine,
2,5-dimethylheptamethylenediamine, 3-methylheptamethylenediamine,
5-methylnonamethylenediamine,
1,4-cyclohexanediamine,
1,12-octadecanediamine,
bis(3-aminopropyl)sulfide,
N-methyl-bis(3-aminopropyl)amine,
hexamethylenediamine, In one embodiment of the present invention the polyetherimide may be a copolymer which in addition to units of Formula I further contains repeating units of the formula

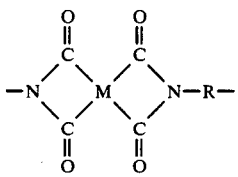

where R is previously defined and M is selected from the group consisting of

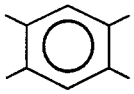,  and

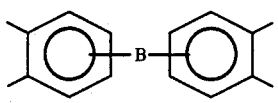

where B is

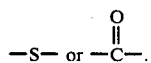

These polyetherimide copolymers are described in U.S. Pat. No. 3,983,093 issued to Williams et al. incorporated herein by reference.

The polyterephthalatecarbonates useful in the present invention are derived from a dihydric phenol, a carbonate precursor, a terephthalic acid or acid derivative and an isophthalic acid or acid derivative. The polyterephthalatecarbonate has from about 60 to about 95 weight percent ester content and from about 5 to about 40 weight percent carbonate content. The ester component contains from about 80 to about 98 weight percent terephthalate groups and from about 2 to about 20 weight percent isophthalate groups.

Polyterephthalatecarbonates may be obtained from the General Electric Company, Pittsfield, Mass. U.S.A. under the designation Lexan ® 3250.

The dihydric phenols which can be employed to prepare the polyterephthalatecarbonates useful in this invention include the dihydric phenols generally found useful in preparing aromatic polycarbonates. Typical dihydric phenols which can be employed are:
2,2-bis(4-hydroxyphenyl)propane(bisphenol A);
2,4-dihydroxydiphenylmethane;
bis(2-hydroxyphenyl)methane;
bis(4-hydroxyphenyl)methane;
bis(4-hydroxy-5-propylphenyl)methane;
bis(4-hydroxy-2,6-dimethyl-3-methoxyphenyl)methane;
1,1-bis(4-hydroxyphenyl)ethane;
1,1-bis(4-hydroxy-2-ethylphenyl)ethane;
2,2-bis(3-phenyl-4-hydroxyphenyl)propane;
bis(4-hydroxyphenyl)cyclohexylmethane; and
2,2-bis(4-hydroxyphenyl)-1-phenylpropane.

Bisphenols other than those having a carbon atom between the two phenols can also be employed. Examples of such groups of bisphenols include bis(hydroxyphenyl)sulfides, bis(hydroxyphenyl)ethers and bis(hydroxyphenyl)sulfoxides and the like.

Preferred dihydric phenols are those of the formula

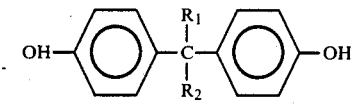

wherein $R_1$ and $R_2$ are the same or different and are hydrogen or alkyl of from one to six carbon atoms, inclusive. The most preferred dihydric phenol is bisphenol A.

The aromatic dicarboxylic acids employed in the preparation of the polyterephthalatecarbonate of the invention are terephthalic acid and isophthalic acid and reactive derivatives thereof. Any derivative of a carboxylic acid which is reactive with the hydroxyl of a dihydric phenol can be employed. The acid halides are generally employed because of their ease of reactivity and availability. The acid chlorides are preferred.

The carbonate precursor employed can be either a carbonyl halide, a carbonate ester or a haloformate. The carbonyl halides which can be employed are carbonyl bromide, carbonyl chloride and mixtures thereof. Typical of the carbonate esters which can be employed are diphenyl carbonate, a di(halophenyl)carbonate such as di(chlorophenyl)carbonate, di(bromophenyl)carbonate, di(trichlorophenyl)carbonate, di(tribromophenyl)-carbonate, etc., di(alkylphenyl)carbonate, such as di(tolyl)-carbonate, etc., di(chloronaphthyl carbonate, etc., or mixtures thereof. The suitable haloformates include bis-haloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

The weight percent ester content in the polyterephthalatecarbonate is from about 60 to about 95, preferably 70 to 90. Above about 95 weight percent ester content, the polyterephthalatecarbonate is generally more difficult to process. Below about 70 weight percent ester content, the polyterephthalatecarbonate's distortion temperatures under load are generally less than desirable. The weight percent ester content is calculated in the manner as described in U.S. Pat. No. 4,465,820.

The quantity of isophthalate units present in the polyterephthalatecarbonate is from about 2 to about 20 weight percent, with the remaining ester units being terephthalate units. When the isophthalate units are below 2 weight percent, the resistance of the polymer to stress cracking is lowered. Above 15 weight percent isophthalate, the Notched Izod impact resistance of the polymer is undesirably low. Preferably, the amount of isophthalate units ranges from about 5 to about 15 weight percent.

The aromatic polyesters that can be used in the present invention are of the formula

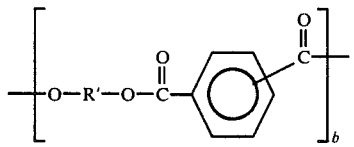

where "b" represents a whole number in excess of 1, R' is a divalent alkylene radical containing from about 1 to about 10 carbon atoms, and the two carbonyl groups are located on the aromatic ring in a para- or meta-position relative to each other.

The polyesters of the above formula can be obtained by any of the methods well-known to those skilled in the art including the reactions of any aromatic dicarboxylic acid of the formula

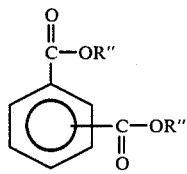

where independently each R" is an alkyl radical having from about 1 to about 10 or more carbon atoms, with any aliphatic diol of the formula

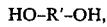

HO-R'-OH, where R' is as previously defined.

As used herein and in the appended claims, the term polyesters include esters prepared by esterifying or transesterifying terephthalic acid, isophthalic acid, or their low molecular weight esters or mixtures thereof, plus other polyesters derived from aromatic dicarboxylic acids or their alkyl esters and other aliphatic diols or polyols other than those above, respectively, subject to the proviso that the polyesters contain at least about 95% by weight polyesters derived from the esterification or transesterification of a dicarboxylic acid of the above formula and aliphatic diols of the above formula.

Preferred polyesters include polyethylene terephthalate and polybutylene terephthalate resins, hereafter sometimes referred to as PET and PBT, respectively. In general, the PET and PBT resins comprise high molecular weight poly(1,4-ethylene terephthalate) resins and poly(1,4-butylene terephthalate) resins having repeating units of the general formulas, respectively:

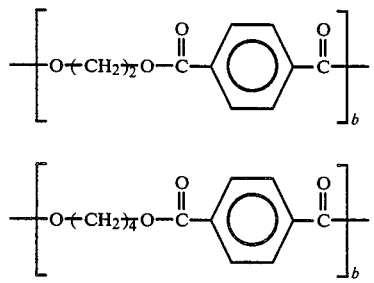

and mixtures thereof, b being as previously defined.

The preferred polyesters of this invention include PET copolyesters and PBT copolyesters, i.e., esters that contain a minor amount, e.g., from about 0.5 to about 2% by weight, of repeating units derived from an aliphatic or another aromatic dicarboxylic acid and/or another aliphatic diol and polyol. Among the units which can be present in the copolyesters are those derived from aliphatic dicarboxylic acids, e.g., acids having up to about 50 carbon atoms, including cycloaliphatic, straight and branched chain acids, such as adipic acid, cyclohexanediacetic acid, dimerized $C_{16-18}$ unsaturated acids (which have 32 to 36 carbon atoms), trimerized such acids, and the like. Among the units in the copolyesters can also be minor amounts derived from aromatic dicarboxylic acids, e.g., acids having up to about 36 carbon atoms, such as isophthalic acid and the like. In addition to the PET and PBT units derived from ethylene glycol and 1,4-butylene glycol, respectively, there can also be minor amounts of units derived from other aliphatic glycols and polyols, e.g., di- and polyols having up to about 50 carbon atoms, including ethylene glycol, propylene glycol, butylene glycol, cyclohexanediol, and the like.

Generally, useful high molecular weight polyester resins have an intrinsic viscosity of at least 0.2 and preferably about 0.8 deciliters per gram (dl/g) as measured in o-chlorophenol, a 60/40 phenoltetrachloroethane mixture or similar solvent systems when measured at 25°-30° C. The upper intrinsic viscosity limit is not critical, however will generally be about 2.5 dl/g. Especially preferred polyester resins will have an intrinsic viscosity within the range of from about 0.5 to about 1.3.

Among the many methods of making the polyesters, which are incorporated herein in their entireties by reference, are those disclosed in the Encyclopedia of Polymer Science and Technology, Vol. II, entitled "Polyesters", pages 62-128, published by Interscience Publishers (1969), as well as those disclosed in Wirth et al., U.S. Pat Nos. 3,787,364 and 3,838,097, etc., and Winfield et al., U.S. Pat. No. 2,465,319, Pengilly, U.S. Pat. No. 3,047,539, etc.

Illustratively, the esterification reactions advantageously can be carried out in an inert atmosphere in the presence of known esterification or transesterification catalysts at nominal reaction temperatures with the simultaneous removal of water or alkanol as produced at elevated temperatures with subsequent further polycondensation at elevated temperatures under reduced pressure in the presence of known catalysts until polyesters of the desired viscosity are obtained.

The instant compositions contain in admixture a polyterephthalatecarbonate, polyetherimide and a polyester. While the ratios of the components may vary depending on the degree of modification desired, generally the relative proportions of the polymers are such that the impact strengths of the unmodified polyetherimide are substantially maintained, while the melt viscosity is reduced. The polyetherimide is generally present in amounts of from about 5 to about 80 percent by weight based on the total weight percent of the three components. Preferably, the polyetherimide is from about 20 to about 60 weight percent. With increasing levels of the polyetherimide, the blend exhibits higher thermal and tensile properties. The polyterephthalatecarbonate is generally present in amounts of from about 5 to about 80 weight percent of the total weight of the three components. Preferably, the polyterephthalatecarbonate is from about 20 to about 60 percent by weight. As the level of polyterephthalatecarbonate increases the blend's heat distortion temperatures decrease while the blend's notched Izod values decrease. The polyester component of the blend is generally from about 15 to 75 about percent of the total ternary blend. Preferably, the polyester is present in amount of from about 25 to about 50 weight percent. As the level of polyester increases the blend's tensile strengths increases, with a decrease in the blend's melt viscosity. While the weight percent of each component may vary, the total weight percent of the three components combined should equal 100 percent.

Methods of forming the ternary blends of the present invention may vary considerably. Prior art blending techniques are generally satisfactory. A preferred method comprises blending the polymers and additives such as reinforcements in powder, granular or filamentous form, extruding the blend, and chopping the extrudate into pellets suitable for molding by means conventionally used to make normally solid thermoplastic compositions.

The present invention contains three distinct and different polymers. It has been discovered that when combined, the resulting blends exhibit new and improved properties superior to those exhibited by each component alone.

The following examples are set forth to further illustrate the present invention and are not to be construed as limiting the invention thereto.

EXAMPLES

Several ternary blends containing a polyetherimide, polyterephthalatecarbonate and a polyester were prepared according to the present invention. The polymers were melt blended at about 300°–315° C. The extrudate was comminuted into pellets and injection molded at about 315° C. into test bars of about 2½ inches × ½ inch × ⅛ inch thick. The test bars were tested for their various properties. The table below lists the results of the tests.

The polyetherimide that was used in the examples is sold commercially under the tradename Ultem ® 1000 by the General Electric Company.

The polyterephthalatecarbonate was prepared by reacting 2,2-bis(4-hydroxyphenol)propane, 36 mole percent phosgene, and 64 mole percent of a 85/15 percent by weight blend of terephthaloyl dichloride and isophthaloyl dichloride in an organic medium with triethylamine, sodium gluconate and phenol, using aqueous sodium hydroxide as the acid acceptor.

The polyester used was polyethylene terephthalate.

Each individual component was injection molded and tested in the same manner as the ternary blends. The data from there controls, which appears in the table below, is included for comparative purposes and is not intended to be included in the scope of the present invention.

TABLE

|  | CONTROLS | | | EXAMPLE 1 | EXAMPLE 2 | EXAMPLE 3 |
|---|---|---|---|---|---|---|
| Polyetherimide | 100 | — | — | 25 | 33 | 25 |
| Polyterephthalatecarbonate | — | 100 | — | 25 | 34 | 50 |
| Polyester | — | — | 100 | 50 | 33 | 25 |
| DTUL @ 264 psi, C.°[1] | 200 | 163 | 100 | 93 | 116 | 119 |
| FlexuralYield - psi[2] | 21,000 | 14,000 | 14,000–18,000 | 16,500 | 18,100 | 15,000 |
| Flexural Modulus - psi[2] | 480,000 | 310,000 | 350,000–450,000 | 406,000 | 406,000 | 380,000 |
| Notched Izod | | | | | | |
| ft/lbs/In/⅛" thick | 1.0 | 6.0 | 0.50 | 1.0 | 1.0 | 1.0 |
| Kasha Index[3] | >100,000 | 50,000 | >1,000 | 5,000 | 9,900 | 10,000 |

[1] determined according to ASTM D648
[2] determined according to ASTM D790
[3] Kasha Index is a measurement of the melt viscosity of the sample. The procedure for determining the Kasha Index is as follows: 7 grams of resin pellets are dried for a minimum of 90 minutes at 125° C. The pellets are then added to a modified Tinius-Olsen T3 melt indexer where the temperature in the indexer is maintained at 300° C. The resin is heated at this temperature for six minutes and is then forced through a 0.04125 inch radius orifice using a plunger of 0.1865 inches and an applied force of 17.7 lbs. The time required for the plunger to travel 2 inches is measured in centiseconds and this is reported as the Kasha Index.

As can be seen from the above table, the ternary blends of the present invention have a lower melt viscosity than the polyetherimide control and polyterephthalatecarbonate control and thus are easier to mold into shaped parts. Examples 2 and 3 have a higher DTUL than the polyester control which demonstrates that one can varying the ratios of the components of the ternary blend to produce a product having good thermal properties and still retain excellent moldability.

The compositions of the present invention have application in a wide variety of physical shapes and form, including the use as films, molding compounds, coatings, etc. When used as films or when made into molded products, these polymers, including laminated products prepared therefrom, not only possess good physical properties at room temperature but they retain their strength and excellent response to workloading at elevated temperatures for long periods of time. Films formed from the polymeric compositions of this invention may be used in application where films have been used previously. Thus, the compositions of the present invention can be used in automobile and aviation applications for decorative and protective purposes, and as high temperature electrical insulation for motor slot liners, in transformers, as dielectric capacitors, as coil and cable wrappings (form wound coil insulation for motors), for containers and container linings, in laminating structures where films of the present composition or where solutions of the claimed compositions of matter are applied to various heat-resistant or other type of materials such as asbestos, mica, glass fiber and the like and superimposing the sheets one upon the other and thereafter subjecting them to elevated temperatures and pressures to effect flow and cure of the resinous binder to yield cohesive laminated structures. Films made from these compositions of matter can also serve in printed circuit applications.

Alternatively, solutions of the compositions herein described can be coated on electrical conductors such as copper, aluminum, etc., and thereafter the coated conductor can be heated at elevated temperatures to remove the solvent and to effect curing of the resinous composition thereon. If desired, an additional overcoat may be applied to such insulated conductors including the use of polymeric coatings, such as polyamides, polyesters, silicones, polyvinylformal resins, epoxy resins, polyimides, polytetrafluoroethylene, etc. The use of the curable compositions of the present invention as overcoats on other types of insulation is not precluded.

In addition, molding compositions and molded articles may be formed from the polymeric compositions in this invention by incorporating such fillers as asbestos, glass fibers, talc, quartz powder, wood flour, finely divided carbon, and silica, into such compositions prior to molding. Shaped articles are formed under heat, or under heat and pressure in accordance with practices well-known in the art. In addition, various heat-resistant pigments and dyes may be incorporated as well as various types of inhibitors depending on the application intended.

Other modifications and variations of the present invention are possible in light of the above teachings. It is, therefore, to be understood that changes may be made in the particular embodiments of the invention described which are within the full intended scope of the invention as defined by the appended claims.

We claim:

1. A thermoplastic composition comprising in admixture (a) from about 5 to about 80 weight percent of a polyetherimide, (b) from about 15 to about 75 weight percent of a polyester selected from the group consisting of polybutylene terephthalate, polyethylene terephthalate, a polybutylene terephthalate copolyester, a polyethylene terephthalate copolyester or mixtures thereof, wherein said polybutylene terephthalate copolyester and polyethylene terephthalate copolyester contain from about 0.5 to about 2% by weight of repeating units derived from an aliphatic dicarboxylic acid having up to 50 carbon atoms, an aromatic dicarboxylic acid having up to 36 carbon atoms or an aliphatic glycol or polyol having up to 50 carbon atoms and (c) from about 5 to about 80 weight percent of a polyterephthalatecarbonate prepared from a dihydric phenol, a carbonate precursor, terephthalic acid or an ester-forming derivative thereof, an isophthalic acid or an ester-forming derivative thereof, said polyterephthalatecarbonate having from about 60 to 95 weight percent ester content, said ester containing from about 80 to about 98 weight percent terephthalate groups and from about 2 to about 20 weight percent isophthalate groups.

2. The composition of claim 1 wherein said polyetherimide contains repeating units of the formula

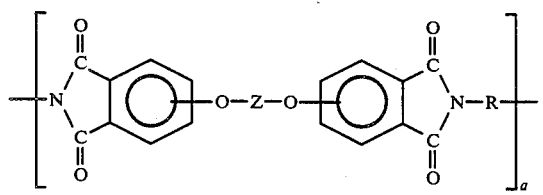

where "a" represents a whole number in excess of 1, —O—Z—O— is in the 3— or 4—, and 3'— or 4'— positions and Z is a member of the class consisting of (1)

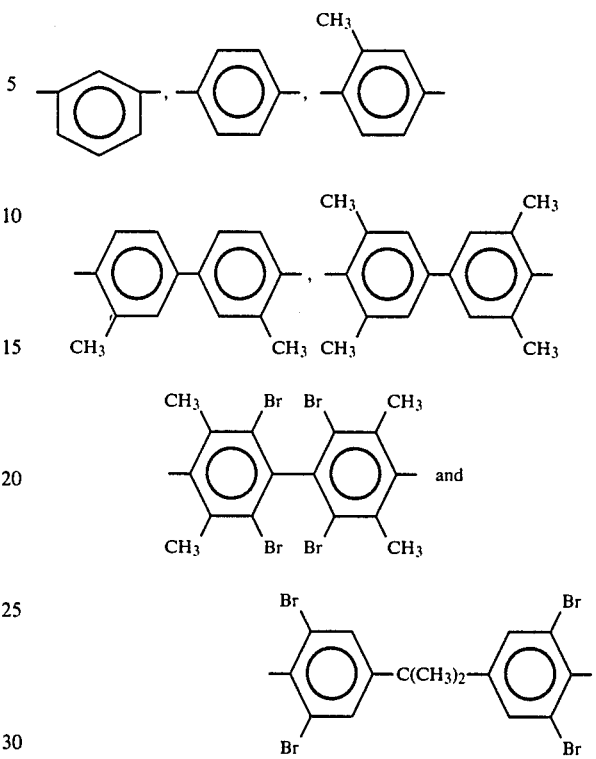

and (2) divalent organic radicals of the general formula

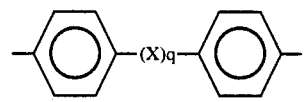

where X is a member selected from the class consisting of divalent radicals of the formulas

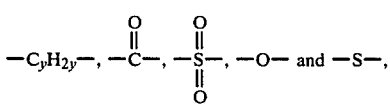

where q is 0 or 1, y is a whole number from 1 to 5, R is a divalent organic radical selected from the class consisting of (a) aromatic hydrocarbon radicals having from 6 to about 20 carbon atoms and halogented derivatives thereof, (b) alkylene radicals and cycloalkylene radicals having from 2 to about 20 carbon atoms, (c) from $C_2$ to about $C_8$ alkylene terminated polydiorganosiloxane, and (d) divalent radicals of the general formula

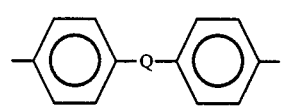

where Q is a member selected from the class consisting of

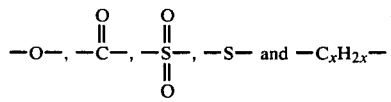

and x is a whole number from 1 to 5 inclusive.

3. The composition of claim 2 wherein said polyetherimide is of the formula

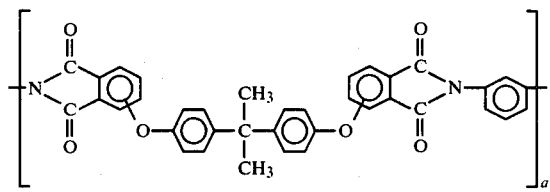

where "a" represents a whole number in excess of 1.

4. The composition of claim 3 wherein the

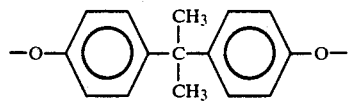

radical of the polyetherimide is situated in the 3,3'-, 3,4'-, 4,3'- and the 4,4'-positions, the ratio of 3:3' and 4:4' positions being within the range of from about 25:75 to about 75:25.

5. The composition of claim 3 wherein said polyetherimide further contains repeating units of the formula

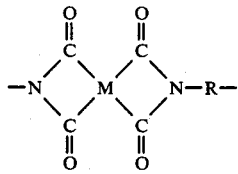

where M is selected from the group consisting of

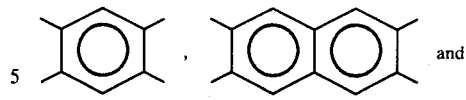

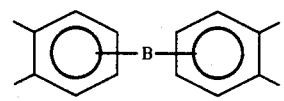

wherein B is

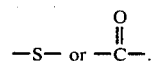

6. The composition of claim 1 wherein the weight percent ester content is from about 70 to 90.

7. The composition of claim 1 wherein the range of isophthalate groups range from about 5 to about 15 weight percent of the ester content.

8. The composition of claim 1 wherein said dihydric phenol is bisphenol A.

9. The composition of claim 8 wherein the ester forming derivative of said acids are selected from the group consisting of terephthaloyl dichloride, isophthaloyl dichloride, and mixtures thereof.

10. The composition of claim 9 wherein said polyterephthalatecarbonate is a copolymer resulting from the condensation of bisphenol A with terephthaloyl dichloride, isophthaloyl dichloride and phosgene.

11. The composition of claim 1 wherein the polyester is polybutylene terephthalate, polyethylene terephthalate or mixtures thereof.

12. The composition of claim 11 wherein the polyester is polybutylene terephthalate.

13. The composition of claim 11 wherein the polyester is polyethylene terephthalate.

14. The composition of claim 1 wherein the polyterephthalatecarbonate is present in amounts of from about 20 to about 60 weight percent, the polyetherimide is present in amounts of from about 20 to about 60 weight percent and the polyester is present in amounts of from about 25 to about 50 weight percent.

* * * * *